(12) United States Patent
Williamson et al.

(10) Patent No.: US 7,650,568 B2
(45) Date of Patent: Jan. 19, 2010

(54) IMPLEMENTING HANDWRITTEN SHORTHAND IN A COMPUTER SYSTEM

(75) Inventors: Peter Williamson, Kirkland, WA (US); Nina Hawley, North Bend, WA (US); Li Lu-Porter, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/767,847

(22) Filed: Jan. 30, 2004

(65) Prior Publication Data

US 2005/0180633 A1 Aug. 18, 2005

(51) Int. Cl.
*G06F 17/00* (2006.01)

(52) U.S. Cl. .................... 715/268; 715/255

(58) Field of Classification Search ............. 715/500, 715/512, 514, 516, 530, 541, 200, 216, 230, 715/255, 268
See application file for complete search history.

(56) References Cited

U.S. PATENT DOCUMENTS

| | | | |
|---|---|---|---|
| 5,347,295 A * | 9/1994 | Agulnick et al. ............ 345/156 |
| 6,340,967 B1 | 1/2002 | Maxted |
| 6,456,740 B1 | 9/2002 | Carini et al. |
| 6,476,834 B1 | 11/2002 | Doval et al. |
| 6,493,464 B1 * | 12/2002 | Hawkins et al. ............ 382/189 |
| 6,493,736 B1 * | 12/2002 | Forcier ...................... 715/541 |
| 6,499,043 B1 * | 12/2002 | Forcier ...................... 715/541 |
| 6,502,114 B1 * | 12/2002 | Forcier ...................... 715/541 |
| 6,538,187 B2 | 3/2003 | Beigi |
| 6,978,421 B1 * | 12/2005 | Aida ......................... 715/532 |
| 2002/0052903 A1 * | 5/2002 | Aida ......................... 707/541 |
| 2004/0047505 A1 * | 3/2004 | Ghassabian ................ 382/186 |
| 2005/0091059 A1 * | 4/2005 | Lecoeuche ............... 704/270.1 |

OTHER PUBLICATIONS

"Handbook for the Palm V™ Organizer," 3Com® Corporation, Table of Contents (pp. ii-vii), Ch. 2 (pp. 25-37) and Ch. 7 (pp. 153-178), 1998.

Hong, Jason I., et al., "Satin: A Toolkit for Informal Ink-based Applications," UIST '00, San Diego, CA, CHI Letters, vol. 2, No, 2, 2000, pp. 63-72.

Meyer, André, "Pen Computing, A Technology Overview and a Vision," SIGCHI Bulletin, vol. 27, No. 3, Jul. 1995, pp. 46-90.

Chatty, Stéphane et al., "Pen Computing for Air Traffic Control," CHI '96, Vancouver, BC, Canada, CHI '96 Papers, Apr. 13-18, 1996, pp. 87-94.

Masui, Toshiyuki, "An Efficient Text Input Method for Pen-based Computers," Proceedings of the ACM Conference on Human Factors in Computer Systems, CHI '98, Apr. 1998, ACM press, pp. 328-335.

Lyon, Richard F., et al., "On-Line Hand-Printing Recognition with Neural Networks," Proceedings of MicroNeuro '96, IEEE, pp. 201-212.

Kukich, Karen, "Techniques for Automatically Correcting Words in Text," ACM Computing Surveys, vol. 24, No. 4, Dec. 1992, pp. 377-439.

\* cited by examiner

*Primary Examiner*—Stephen S Hong
*Assistant Examiner*—Gregory J Vaughn
(74) *Attorney, Agent, or Firm*—Shook Hardy & Bacon LLP

(57) ABSTRACT

Handwritten shorthand is used and interpreted in a stylus-based interface to trigger expanded text, implement functions, and/or launch executable programs. A user may be able to select a type of shorthand entry to define, such as a text-expansion-type shorthand entry, a function-type shorthand entry, or a program-type shorthand entry. Upon receiving handwritten input, a computer may determine whether or not to interpret the handwritten input as shorthand, or whether to act upon the handwritten shorthand, depending upon the context in which it is written.

17 Claims, 9 Drawing Sheets

IMPLEMENTING HANDWRITTEN SHORTHAND IN A COMPUTER SYSTEM

FIELD OF THE INVENTION

The present invention is directed to managing, implementing, and interpreting handwritten shorthand in a computer system.

BACKGROUND OF THE INVENTION

Over the last few years, it has become more common for hand-held and laptop computers to incorporate stylus-based user interfaces. Such stylus-based computers typically include a digitizing flat panel display surface. Using the tip of the stylus, a user may select, highlight, and write on the digitizing display surface. The stylus-based computer interprets marks made using the stylus in order to manipulate data, enter text, and execute conventional computer application tasks such as spreadsheets, word processing programs, and the like. Stylus-based computers can also recognize handwritten symbols, such as alphanumeric characters, as well as command-type gestures.

The stylus-based interface thus provides a natural way for the user to interact with a computer. However, because the stylus-based interface has just recently become commonplace, its fill potential has not yet been realized; there is room for improvement.

SUMMARY OF THE INVENTION

Aspects of the present invention are directed to the use of shorthand in a stylus-based interface. For example, a user may associate a shorthand version of a longer word or phrase. When the user writes the shorthand version on a stylus-based computer, the computer may recognize the shorthand writing and replace it with associated expanded text. Or, the user may associate a shorthand entry with a particular function. When the user writes the shorthand entry, the associated function may be implemented. Another way a user may use shorthand is to associate a shorthand entry with a particular executable program. When the user writes the shorthand entry, the associated program may be launched.

Further aspects of the present invention are directed to enabling a user to select and define a particular type of shorthand entry. The user may be able to select the type of shorthand entry from, e.g., a single user interface screen.

Still further aspects of the present invention are directed to determining whether or not to interpret handwritten input as shorthand, or determining whether to act upon handwritten shorthand, depending upon the context in which it is written. For example, if a shorthand word is written without any other handwritten input, then an associated program may be launched. However, if the shorthand word is written along with other handwritten input, then the program may not be launched responsive to the shorthand word.

These and other aspects of the invention will be apparent upon consideration of the following detailed description of illustrative embodiments.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION OF ILLUSTRATIVE EMBODIMENTS

General Computing Platforms

Figure 1:
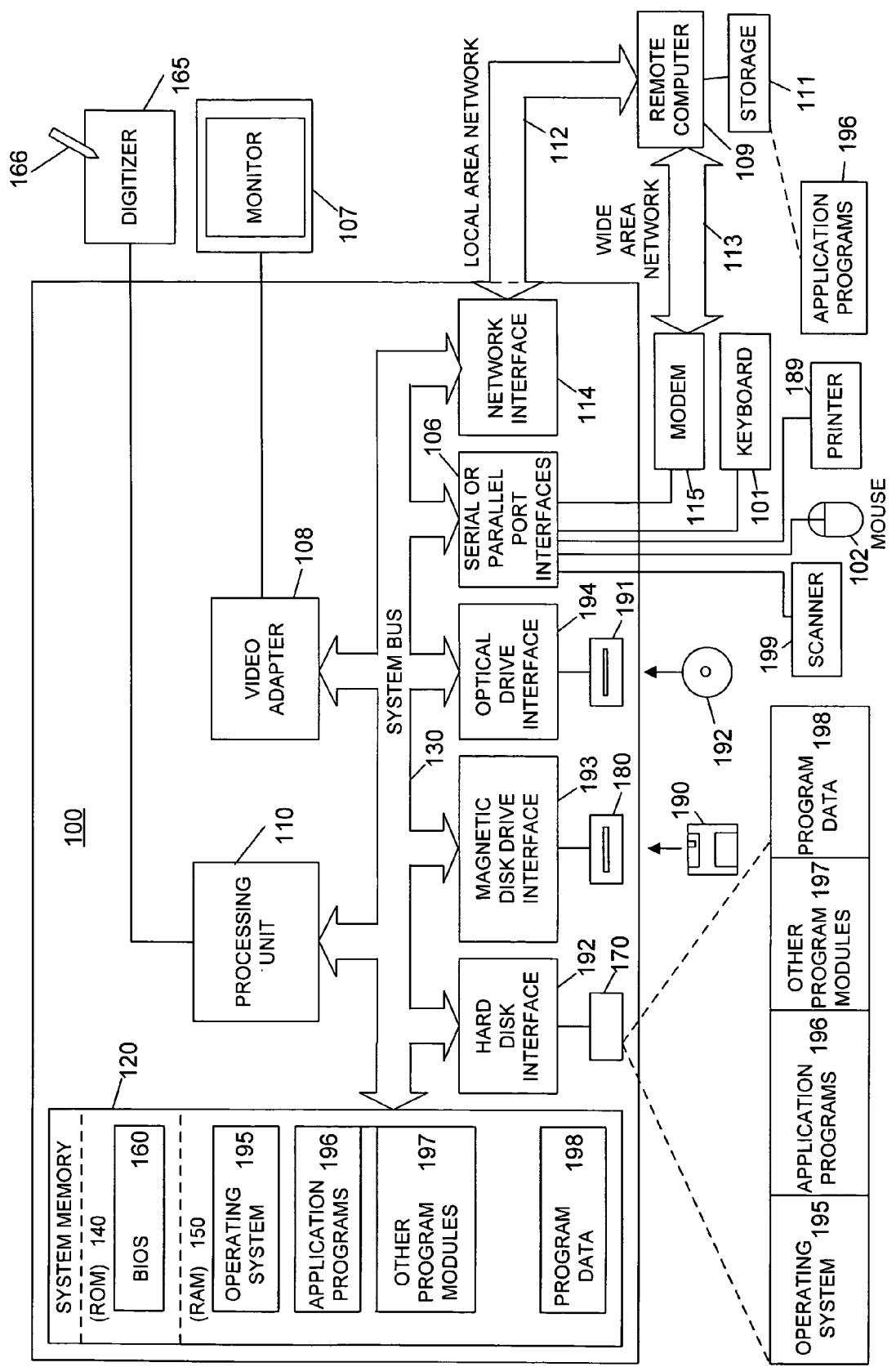
FIG. 1 is a functional block diagram of an illustrative conventional general-purpose digital computing environment.

FIG. 1 is a functional block diagram of an example of a conventional general-purpose digital computing environment that can be configured and used to implement various aspects of the present invention. In FIG. 1, an illustrative computer 100 includes a processing unit 110, a system memory 120, and a system bus 130 that couples various system components including the system memory to the processing unit 110. The computer 100 may be any type of computer, such as, but not limited to, a mainframe, a server, a personal computer, a laptop computer, or a palmtop computer.

Describing the details of the structure of the computer 100 in FIG. 1, the system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the computer 100.

It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment. The term "computer-readable medium," as used herein, is intended to include a single medium as well as a collection of physically separate media, such as, for example, a collection of CD ROMs, or a CD ROM in combination with a computer memory.

A number of program modules may be stored on the hard disk drive 170, magnetic disk 190, optical disk 192, ROM 140, and/or RAM 150, including an operating system 195, one or more application programs 196, other program modules 197, and/or program data 198. A user can enter commands and information into the computer 100 through input devices such as a keyboard 101 and pointing device 102. Other input devices may include a microphone, joystick, game pad, satellite dish, scanner 199, stylus, or the like. These and other input devices may be coupled to the processing unit 110 through a serial port interface 106 that is coupled to the system bus, or they may be coupled by other interfaces such as a parallel port, a game port, or a universal serial bus (USB). Further still, these devices may be coupled directly to the system bus 130 via an appropriate interface (not shown).

A monitor 107 or other type of display device may also be connected to the system bus 130 via an interface, such as a video adapter 108. In addition to the monitor, personal computers typically include other peripheral output devices (not shown), such as speakers and printers. In a preferred embodiment, a stylus digitizer 165 and accompanying stylus 166 are provided in order to digitally capture freehand input. Although a direct connection between the stylus digitizer 165 and the processing unit 110 is shown, in practice, the stylus digitizer 165 may be coupled to the processing unit 110, via the serial or parallel port 106 or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the computer 100, or portions thereof, may be stored in the remote memory storage device.

It will be appreciated that the network connections shown are illustrative, and other techniques for establishing a communications link between the computers may be used. The existence of any of various well-known protocols such as TCP/IP, Ethernet, FTP, HTTP, and the like is presumed, and the system may be operated in a client-server configuration to permit a user to retrieve Internet web pages from a web-based server. Any of various conventional web browsers may be used to display and manipulate data on web pages.

Figure 2:
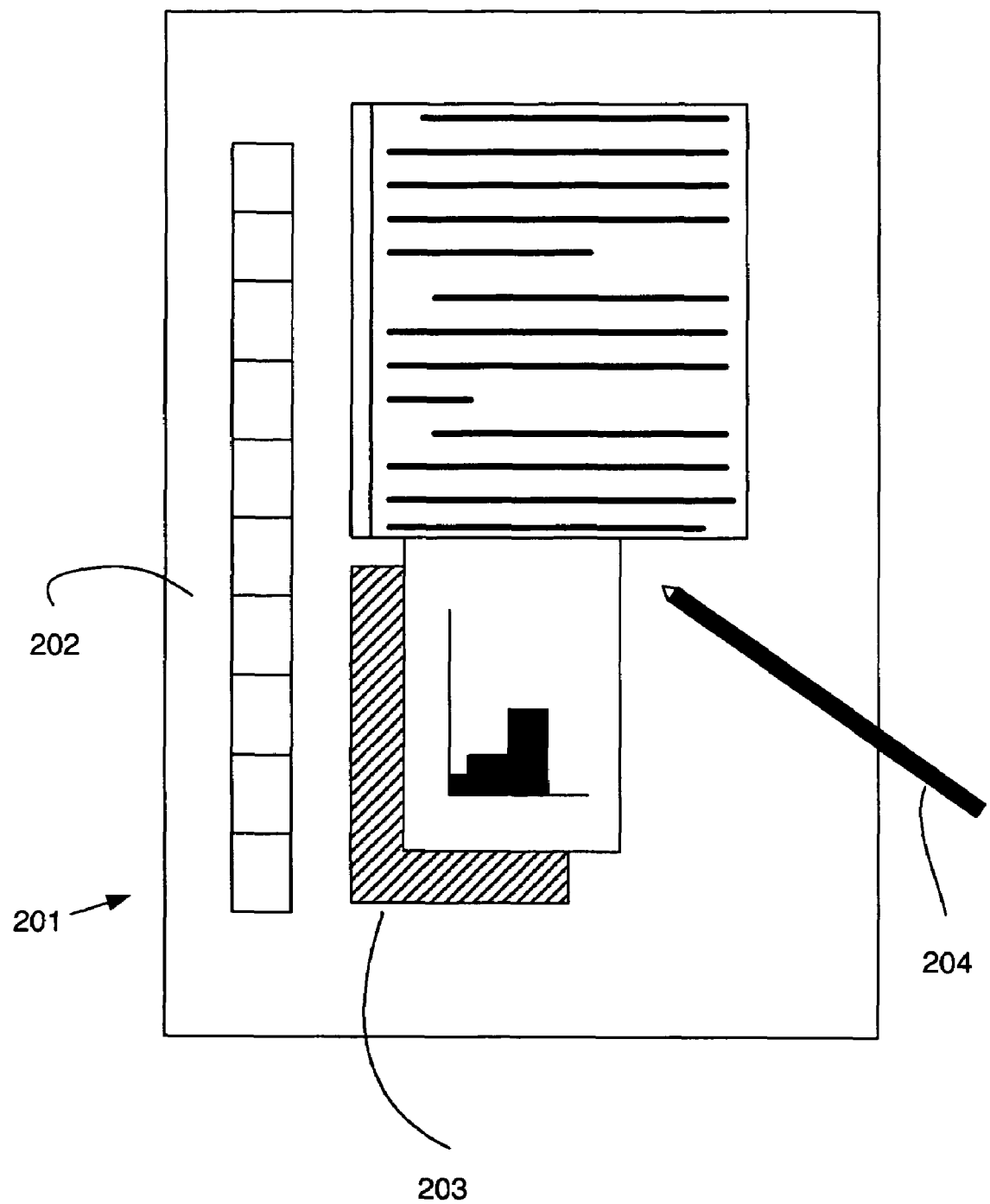
FIG. 2 shows an illustrative stylus-based computer processing system.

FIG. 2 shows an example of a stylus-based computer 201 that may be used in accordance with various aspects of the present invention. Any or all of the features, subsystems, and functions in the system of FIG. 1 may be included in the computer of FIG. 2. As in the computer 100, the stylus-based computer 201 may be any type of computer, such as, but not limited to, a mainframe, a server, a personal computer, a laptop computer, or a palmtop computer. However, for illustrative purposes the stylus-based computer 201 will be referred to herein as a tablet computer, as it may conveniently be shaped like a paper tablet (for example).

The tablet computer 201 includes a display surface 202, e.g., a digitizing flat panel display, preferably, a liquid crystal display (LCD) or OLED screen, plasma display, or the like, on which a plurality of windows 203 is displayed. Using the tip of the stylus 204 (the tip also being referred to herein as a "cursor"), a user may select, highlight, and write on the digitizing display surface. Examples of suitable digitizing display panels include electromagnetic stylus digitizers, such as stylus digitizers by Wacom Technology Corporation. Other types of stylus digitizers, e.g., optical digitizers, may also be used. The tablet computer 201 interprets marks made using stylus 204 in order to manipulate data, enter text, and execute conventional computer application tasks such as spreadsheets, word processing programs, and the like.

The stylus 204 may be equipped with buttons or other features to augment its selection capabilities. In one embodiment, the stylus 204 may be implemented as a "pencil" or a "pen," in which one end of the stylus 204 functions as a writing portion and the other end functions as an erasing portion. When such a stylus 204 is moved across the display surface 202, portions of the display which are to be erased may be indicated. Other types of input devices, such as a mouse, trackball, or the like may additionally or alternatively be used. The stylus 204 does not necessarily need to be a separate device, but may even be the user's own finger. Consequently, the term "user input device," as used herein, is intended to have a broad definition and encompasses many variations on well-known input devices.

Electronic Ink

The term "ink" as used herein refers to electronic ink unless otherwise specified. The electronic ink may be structured as a sequence or set of strokes, where each stroke includes a sequence or set of points. A sequence of strokes and/or points may be ordered by the time captured and/or by where the strokes and/or points appear on a page. A set of strokes may include sequences of strokes and/or points, and/or unordered strokes and/or points. The points may be represented using a variety of known techniques including Cartesian coordinates (X, Y), polar coordinates (r, $\Theta$), and other techniques as known in the art. A stroke may alternatively be represented as a point and a vector in the direction of the next point. A stroke is intended to encompass any representation of points or segments relating to ink, irrespective of the underlying representation of points and/or what connects the points.

Ink collection typically begins at a digitizer (such as the digitizer of the display surface 202 of the tablet computer 201). A user may place a stylus (such as the stylus 204) on the digitizer and begin to write or draw. At that point, new ink packets (i.e., packets of ink-related data) may be generated. Packets may include not only position information but also stylus pressure and/or angle information. The ink may represent strokes that form drawings or symbols. The user may also generate ink by moving the stylus in the air proximate enough to the digitizer to be sensed by the digitizer without actually touching the digitizer.

As used herein, the term "symbol" is intended to broadly encompass any ink representation(s) or character(s) that the user can write with a stylus. Any input written with a stylus is called "handwritten" input, regardless of whether the user actually uses his or her hand to manipulate the stylus. The term "character" is intended to encompass an ink representation of a symbol used in a given written language system. For example, the term "character" includes alphanumeric characters (such as in the English language), mathematical characters (such as numbers, parentheses, the plus or minus sign, etc., in the language of mathematics), and Japanese katakana, hiragana, and kanji. The term "alphanumeric" is intended to encompass those symbols of a given language that are alphabetic and/or numeric in a given language. For example, alphanumeric characters include the English letter "a" and the Arabic numeral "3," as well as alphabetic and/or numeric characters in other languages.

Handwritten ink symbols, especially alphanumeric characters, may be automatically recognized by a computer using any of a number of well-known handwriting recognition algorithms. Once recognized, the handwriting may be stored as a set of characters in a non-ink format such as in a text format (e.g., ASCII format).

Defining Shorthand Entries

One or more handwritten "shorthand" entries may be defined that may be acted upon in various ways. Broadly defined, "shorthand" is a symbol that is associated with something else, called herein an "expansion." In response to receiving handwritten shorthand, a computer may apply the associated expansion. Shorthand would typically be, but is not necessarily, shorter to write than the expansion associated with the shorthand. For example, the alphanumeric characters "dt" may be shorthand for the expanded text "date" or for the actual value of today's date. Similarly, the alphanumeric characters "word" may be shorthand for indicating that the user desires that a word processing program be executed. One or more shorthand entries may be predefined by software distributors and/or may be user-defined. A shorthand entry may be any symbol or combination of symbols. In some embodiments, the shorthand entry is exclusively alphanumeric. In such embodiments, the shorthand entry may not need any special identifying symbol for the computer to recognize it as shorthand. In still further embodiments, the shorthand entry may be a single word or multiple words.

A shorthand entry may be associated with one or more expansions such as expanded text, a function, or a program. In the context of these types of shorthand entries, to "apply" expanded text is to display the expanded text, to apply a function is to implement the function, and to apply a program is to launch the program. An example of expanded text includes, as previously discussed, the word "date" associated with the shorthand "dt." Other examples of expanded text include "myname" for a predefined name, or the word "keyboard" associated with the shorthand "kbd." An example of a function includes, as previously discussed, displaying the value of today's date (which may depend upon the value of the computer's internal clock). Examples of programs include word processing programs, spreadsheet programs, Internet browser programs, etc. For any of the shorthand types, the user may choose from a predefined set of expanded text, functions, and/or programs, and/or the user may custom-define expanded text, functions, and/or programs.

Handwritten user input, which may include shorthand, may be received and interpreted from within a running program, such as within a document displayed in a word processing program, or outside of a program, such as from the operating system shell. For example, if the user writes "word" from a spreadsheet program, a word processing program may, in response, be launched. Similarly, if the user writes "word" in the context of the operating system shell, the word processing program may also be launched or a different expansion may be applied.

Figure 3:
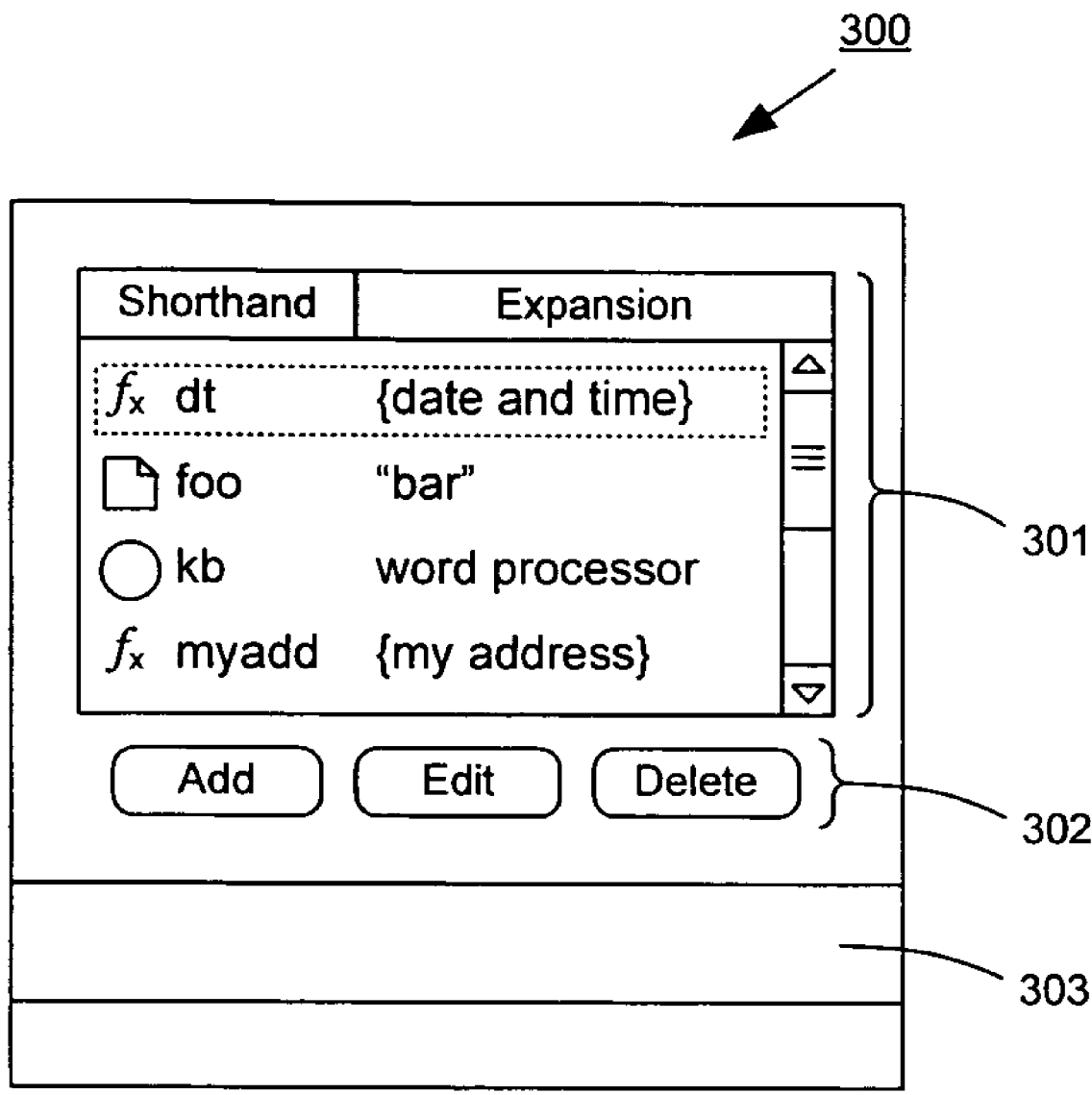
FIG. 3 shows an illustrative user interface indicating a plurality of available shorthand entries.

FIG. 3 shows an illustrative user interface 300 that may be displayed on a display (such as the display surface 202), from which a user may view a listing 301 of shorthand entries. The listing 301 may display each shorthand entry along with its respective associated expansion. The listing 301 may be stored in any memory or other storage device of the computer, and may be stored in database form, tabular form, or in any other form. However the information for the listing 301 is stored, the information may include a set of shorthand entries each associated with a respective type identifier and/or a respective expansion. The type identifier includes information identifying the type of shorthand entry (e.g., text expansion, function, or program).

In the example shown, the shorthand "dt" is associated with its respective expansion, the function {date and time}. The type identifier for "dt" would thus indicate that this shorthand entry is a function-type shorthand entry. As shown below in Table 1, the function {date and time} displays the current date and time in place of the user's handwritten shorthand "dt." Other shorthand entries shown in FIG. 3 are "foo," which is associated with expanded text "bar," "kb," which is associated with a word processing program, and "myadd," which is associated with the function {my address} (also described in Table 1). The listing 301 may further include indicia showing the type of each shorthand entry. The indicia may be graphical icons or any other type of indicia. In FIG. 3, the indicia are illustratively displayed to the left of the shorthand entries. The shorthand listing user interface 300 may further include one or more buttons 302 or other user interface elements that allows the user to add new shorthand entries, or edit or delete selected shorthand entries. The shorthand listing interface 300 may further include one or more tools (indicated by area 303). The tools may include, e.g., a virtual keyboard, file access tools, and/or editing tools.

Figure 4:
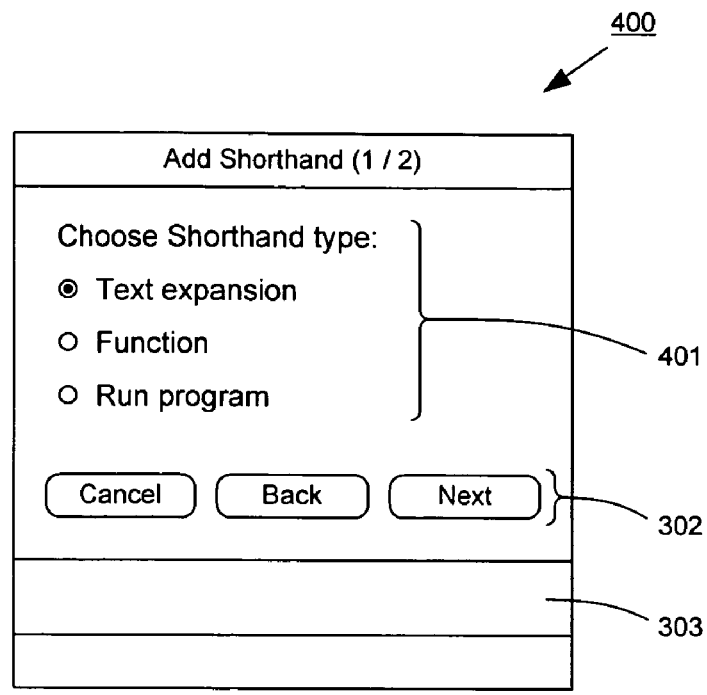
FIGS. 4, 6, and 8 show an illustrative user interface enabling a user to select which type of shorthand entry is to be defined.

FIG. 4 shows an illustrative user interface 400 that may appear in response to the user choosing to add a new shorthand entry from user interface 300. The user interface 400 may display a user-selectable listing 401 of shorthand types, such as, but not limited to, a text expansion shorthand entry, a function shorthand entry, and a program shorthand entry. By choosing a shorthand type or types, the user may begin to define a new shorthand entry.

Figure 5:
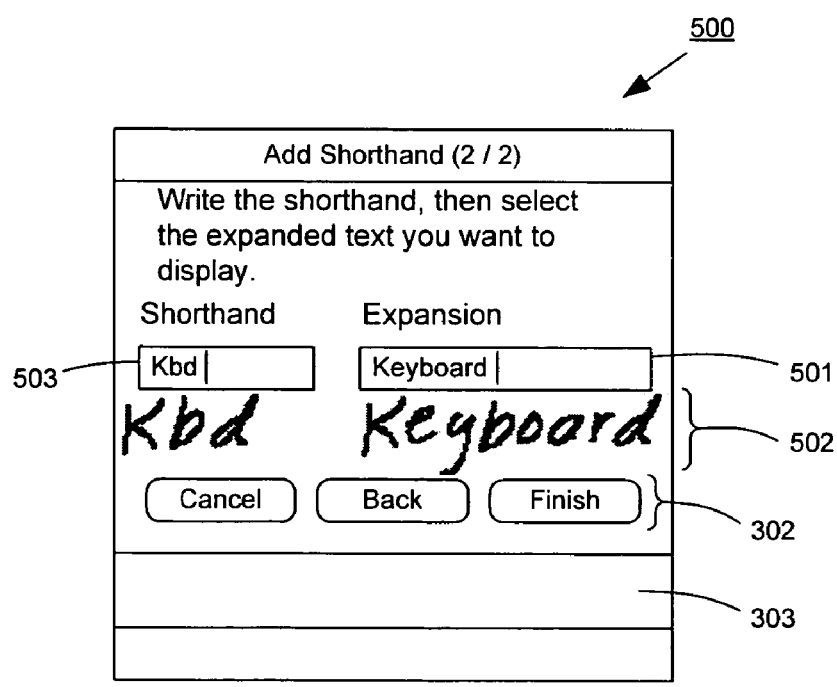
FIG. 5 shows an illustrative user interface with which a user may define a text-expansion-type shorthand entry.

For example, if the user selects the text expansion type of shorthand and selects the "next" button, then a user interface 500 such as shown in FIG. 5 may appear. The user interface 500 may receive handwritten input 502 that defines the shorthand entry. For example, the user may select text box 503 (e.g., by clicking in it) and then hand-write in the shorthand entry "kbd". The recognized textual version of the user's handwriting would then appear in a selected text box 501, which would show what the computer interpreted to be the user's defined shorthand entry. To define the expansion associated with the shorthand entry, the user may select text box 501 and then hand-write in the expansion "keyboard". The computer 201 may recognize the user's handwriting and print the recognized text into the text box 501, indicating what the computer interpreted to be the user's defined expansion. Alternatively, the user may type "kbd" directly into the text box 503 and/or type "keyboard" directly into the text box 501, instead of hand-writing these entries. Using either input method, the user may define both the shorthand entry (in this case, "kbd") as well as the expansion (in this case, expanded text "keyboard").

Figure 6:
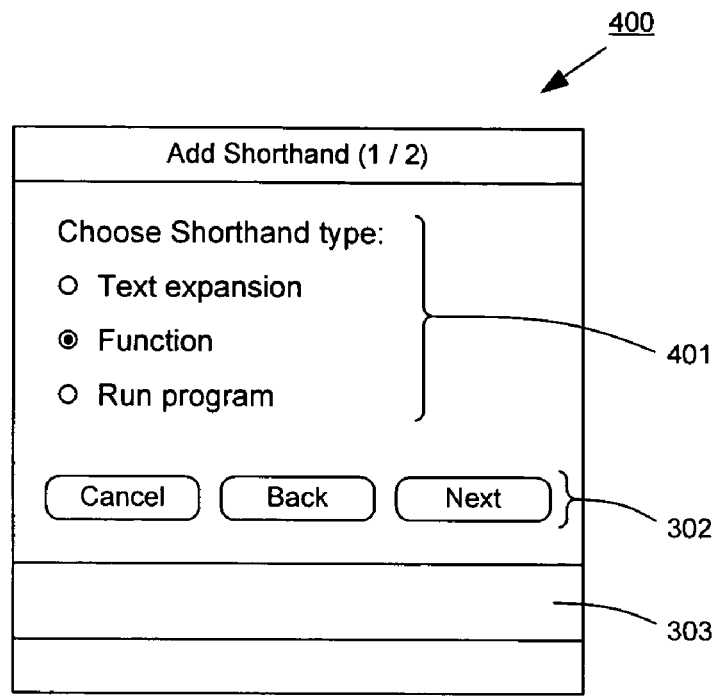
Figure 7:
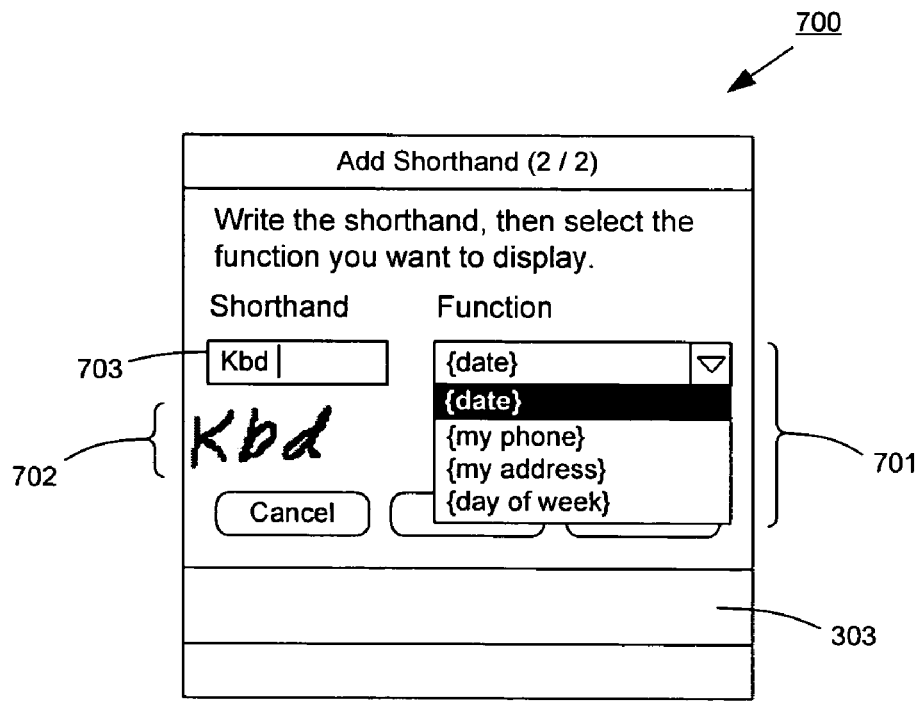
FIG. 7 shows an illustrative user interface with which a user may define a function-type shorthand entry.

If, from the user interface 400, the user selects to add a function-type shorthand entry (as shown in FIG. 6), then a user interface such as user interface 700 (FIG. 7) may appear. The user interface 700, like the user interface 500, may also receive typewritten text and/or handwriting 702. The user interface 500 may include text boxes 701, 703 for indicating and/or receiving user-defined expansions and shorthand entries, respectively. As shown, the text box 701 includes a drop-down menu listing a plurality of functions from which the user may select. The plurality of functions listed in the drop-down menu may include functions pre-defined by a software developer and/or by the user. For example, as shown the drop-down menu may include {date}, which inserts the current date, {my phone}, which inserts a predetermined phone number such as the user's phone number, {my address}, which inserts a predetermined address such as the user's address, and {day of the week}, which inserts the current day of the week. Other functions may be available, such as, but not limited to, those listed in Table 1. As shown in FIG. 7, the user has selected that the shorthand entry "kbd" is to cause today's date to be inserted.

Functions differ from expanded text in that the outcome of an applied function depends upon some variable, where expanded text is a constant. For example, the expanded text "keyboard" always displays the word "keyboard" whenever it is determined that the user intended to write shorthand for "keyboard" (e.g., the shorthand "kbd"). On the other hand, when the function {date}, for example, is applied, it inserts a date that is dependent upon the state of a clock, such as the computer's internal clock. As another example, the function {my name} inserts a name that is dependent upon which user is logged on to the computer and/or which user is registered as the owner of the computer. Functions may also be considered as being in various classes of functions. For instance, some functions, such as {date and time}, {date}, {time}, {day of week}, {day of month}, {month}, and {year}, may be considered as functions that insert calendar information. Other functions, such as {my name}, {my email}, {my phone}, and {my company}, may be considered as functions that insert contact information. Still other functions may include providing information and/or a user interface. For example, a function may be to open a contact list for viewing the list, editing the list, and/or selecting from the list.

TABLE 1

Examples of Available Functions

| Function | Action | |
|---|---|---|
| {date and time} | Insert current date and time | e.g., Jul. 10, 2001 11:35 AM |
| {date} | Insert current date | e.g., Jul. 10, 2001 |
| {time} | Insert current time | e.g., 11:35 AM |
| {day of week} | Insert day of the week | e.g., (Monday, Tuesday, . . . ) |
| {day of month} | Insert day of the month | e.g., (01, 15, 24, . . . ) |
| {month} | Insert month | e.g., (January, February, . . . ) |
| {year} | Insert current year | e.g., (2001, . . . ) |
| {my name} | Insert device owner's name | |
| {my email} | Insert device owner's email | |
| {my address} | Insert device owner's address | |
| {my phone} | Insert device owner's phone | |
| {my company} | Insert device owner's company name | |

Figure 8:
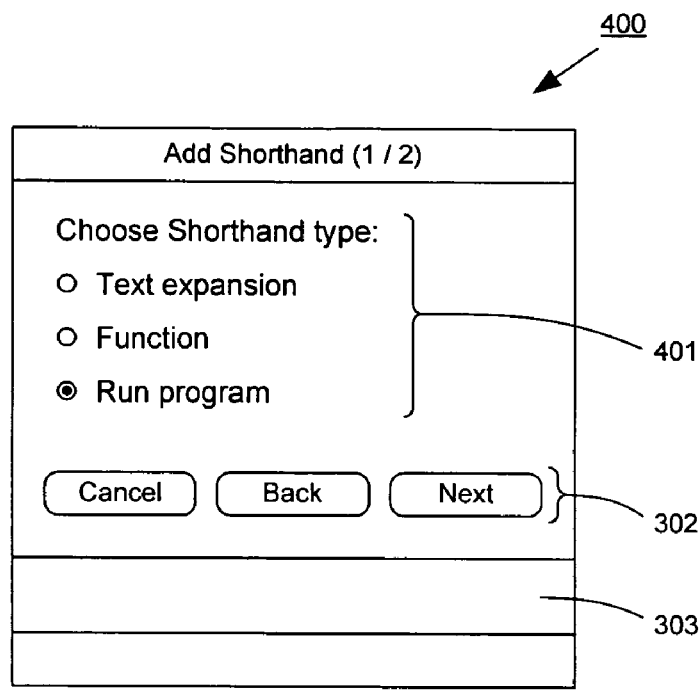
Figure 9:
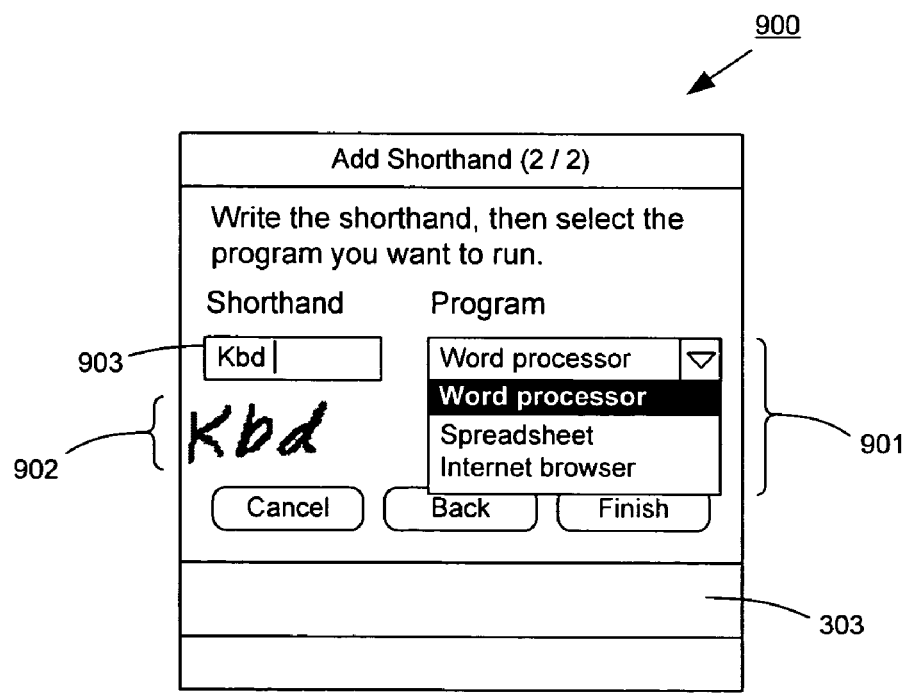
FIG. 9 shows an illustrative user interface with which a user may define a program-type shorthand entry.

Referring now to FIGS. 8 and 9, the user may instead decide to define a program-type shorthand entry. A user interface 900 may appear, allowing the user to select an executable program to associate with a shorthand entry. The user interface 900 may include text boxes 901, 903 for indicating and/or receiving user-defined expansions and shorthand entries, respectively. As in previously-described user interfaces, the user may hand-write 702 and/or type in the shorthand entry (e.g., "kbd"). The text box 901 may include a drop-down menu listing a plurality of executable programs that exist on the computer. The computer may find all installed executable programs on the computer and place the found programs into the drop-down menu. In the example shown, the drop-down menu may include such programs as a word processing program, a spreadsheet program, and an Internet browser program. However, other programs may be available. The listing of programs in the drop-down menu may automatically depend upon which programs are installed on the computer. As shown in FIG. 9, the user has selected that the shorthand "kbd" 902 cause a word processor to execute.

A single shorthand entry, such as "kbd," may be associated with only a single expansion, such as a single expanded text, or a single function, or a single program. However, the user may associate a single shorthand entry with more than one expansion of the same type and/or of different types. For example, the shorthand "kbd" may be associated with both expanded text and with a function, or with both expanded text and a program, or with both a function and a program. As another example, the shorthand "kbd" may be associated with first expanded text in a first context and different second expanded text (or a function or program) in a second context. For instance, when "kbd" is written in the context of a word processing program, the word text expansion "keyboard" may responsively appear, whereas when "kbd" is written in the context of an operating system shell or another program, the word processing program is responsively launched. Many other combinations are possible. As will be described, the shorthand entry may be recognized and acted upon in a manner that depends upon the context in which the shorthand entry is written.

Recognizing Handwritten Shorthand

Assuming that the user and/or application developer has defined one or more shorthand entries, the computer may recognize a handwritten shorthand entry and act appropriately based on the entry. How the computer acts upon the handwritten shorthand entry may depend upon both the type of shorthand, the context in which the shorthand is written, and/or certain variables. For example, if the shorthand "kbd" is associated only with the expanded text "keyboard," then the computer may always replace "kbd" with "keyboard." Or, if the shorthand "kbd" is associated with a word processing program, then the word processing program may be launched in response to the shorthand entry only in certain situations. This is because it may not be desirable or convenient for the word processor to be launched every time the user writes "kbd." The user may sometimes intend to write the letters "kbd" for what they are, or may intend that the letters "kbd" be replaced with the text expansion "keyboard." It may be up to the computer to automatically decide the most likely intention of the user in such a situation.

Figure 10:
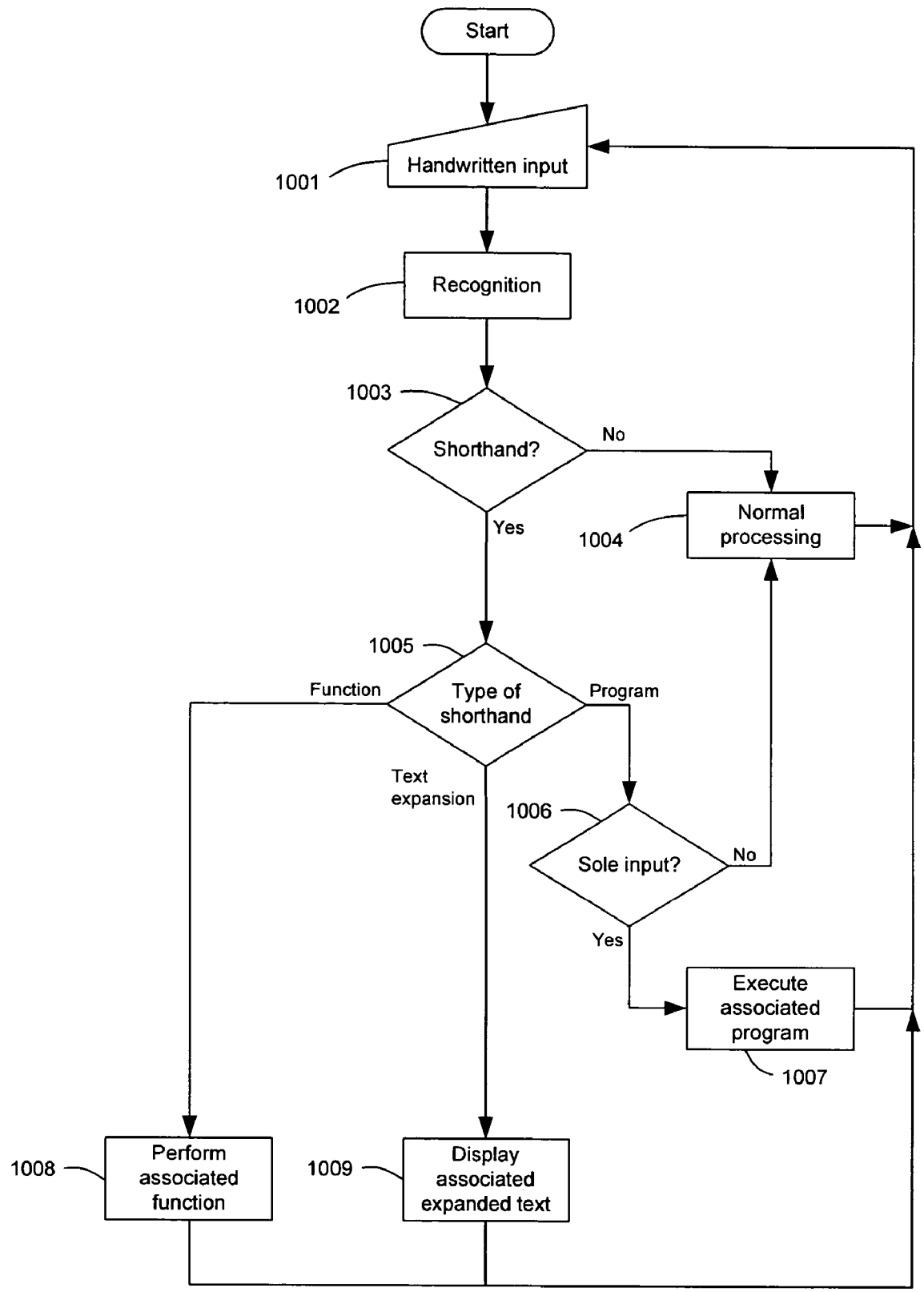
FIG. 10 is an illustrative flowchart showing steps that may be taken to receive, interpret, and act upon handwritten shorthand.

Therefore, the computer may execute one or more algorithms to make a contextual determination of the user's most likely intent, such as illustratively shown in FIG. 10. If it is determined that the user most likely intended to write shorthand, then the expansion associated with the shorthand would be applied. Otherwise, the expansion would not be applied or an alternate expansion may be applied. Referring to FIG. 10, the computer may receive handwritten input from the user (step 1001), which may be any symbol such as, but not necessarily limited to, alphanumeric characters. The computer may recognize the handwritten user input (step 1002), such as by converting the handwritten user input into text. The computer may then determine whether or not the handwritten input is shorthand (step 1003) by determining whether the handwritten input matches one of the predefined shorthand entries. If the computer determines that the handwritten user input is not shorthand, then the computer may process the handwritten input as it would otherwise normally process handwritten user input (step 1004).

However, the computer may determine that the handwritten user input is shorthand. This may occur because the recognized handwritten user input may match one of the predefined shorthand entries. If so, then the computer may further determine the type of shorthand of the handwritten user input (step 1005). As shown, the handwritten user input may be an text-expansion-type shorthand entry, a function-type shorthand entry, or a program-type shorthand entry. If the handwritten user input is a function-type shorthand entry, then the associated function is performed (step 1008). Likewise, if the handwritten user input is a text-expansion-type shorthand entry, then the associated expanded text is displayed instead of the original shorthand entry (step 1009).

In the embodiment shown, the analysis may be more complex for a program-type shorthand entry. If it is determined that a program-type shorthand entry has been hand-written, then in step 1006 the computer may determine whether the shorthand entry is the sole handwritten input. For example, referring to FIG. 11, the user may hand-write "kbd", as indicated in the figure by element 1101. If this were all that were written, then "kbd" may be considered to be the sole handwritten input, and the associated program may be executed (step 1007). On the other hand, if the word "bear" (for example), as indicated in the figure by element 1102, were also written and simultaneously displayed (such as displayed as ink or as recognized text), then "kbd" would be associated with "bear" and would not be considered the sole handwritten input, and normal processing of the handwritten user input may therefore occur in step 1004. A reason that it may be desirable to determine whether the handwritten input is the sole handwritten input is to reduce the likelihood that a program may be executed inconsistently with the user's intentions. It may be presumed that the user does not intend, for example, to launch a word processing program every time the user writes "kbd." Instead, the user is more likely to be requesting the word processing program to launch only when the user writes "kbd" (for example) by itself. Thus, the analysis in FIG. 10 with a program-type shorthand entry may automatically take the context of the user's handwritten input into account when determining whether to execute the associated program.

Figure 11:
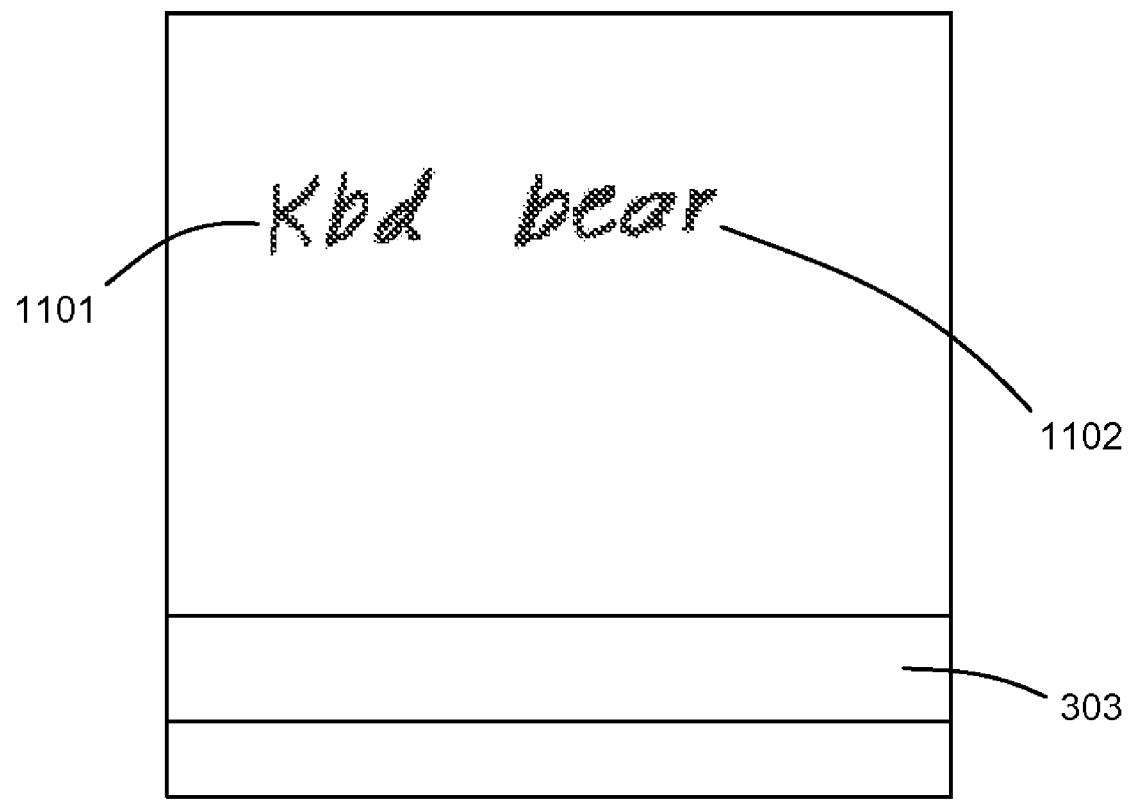
FIG. 11 shows an illustrative user interface with which a user may write with a stylus.

The computer may determine that particular handwritten input is the sole handwritten input in a number of ways. The determination may be made on a screen-by-screen basis. For example, if handwritten input 1101 in FIG. 11 is the only handwritten input present on the display (e.g., on the display surface 202) at a given time, then handwritten input 1101 may be considered to be the sole handwritten input. Or, the determination may be made on a line-by-line basis. For example, if both handwritten input 1101 and handwritten input 1102 are present on the display but on separate written lines, then each handwritten input 1101, 1102 may be considered to be the sole handwritten input for its respective line. Or, the determination may be made on an input-area-by-input-area basis (e.g., an input window or box). For example, if handwritten input 1101 is in a first input window on the display surface 202, and handwritten input 1102 is in a second input window on the display surface 202, then each handwritten input 1101, 1102 may be considered to be a sole handwritten input for its respective input window.

The determination as to whether a particular entry of handwritten user input is the sole handwritten user input may be affected by how and when the determination is made. A user will take a certain amount of time to write, and typically there is a certain amount of delay to be expected between written characters, words, and sentences. Therefore, it may be desirable for the computer to wait a predetermined period of non-zero time before recognizing the handwritten input and/or making a determination, to give the user a chance to complete the intended handwritten input. For example, the user may write handwritten input 1101, wait a fraction of a second, and then write handwritten input 1102. If, prior to handwritten input 1102 being written, the computer were to make a determination that the handwritten input 1101 is the sole handwritten input, such a determination may likely be made error. However, if the computer delayed a reasonable amount of time to give the user the opportunity to write additional input (if any), such as handwritten input 1102, then the determination may more likely be made correctly in accordance with the user's intentions. The delay may be any appropriate amount of delay, such as about one second or more. The delay may be fixed or it may be user-defined and/or application-defined. The delay may begin to be counted in response to handwritten input being stopped, which may be indicated, for example, by the stylus being removed from the touch-sensitive display, or by the stylus remaining motionless for a period of time, or by the stylus making some gesture or selecting some displayed user interface element such as a graphical button, or at the end of a handwritten word. In some embodiments, the computer may count the total number of words that are written, and if the number is greater than one, then the computer interprets this to be more than a single handwritten input.

Variations of the analysis of FIG. 10 can be conceived. For example, the analysis may be modified to be able to handle the situation where a particular shorthand entry is associated with two or more different types of expansions. If, for instance, a shorthand entry is associated with both expanded text and with a program, then either the expanded text or the program, or both, may be implemented depending upon the context in which the handwritten user input containing the shorthand is written. If the handwritten user input is the sole handwritten user input, then the program may be launched. If, on the other hand, the handwritten user input is not the sole handwritten user input, then the expanded text may alternatively be inserted and the program not launched.

Figure 12:
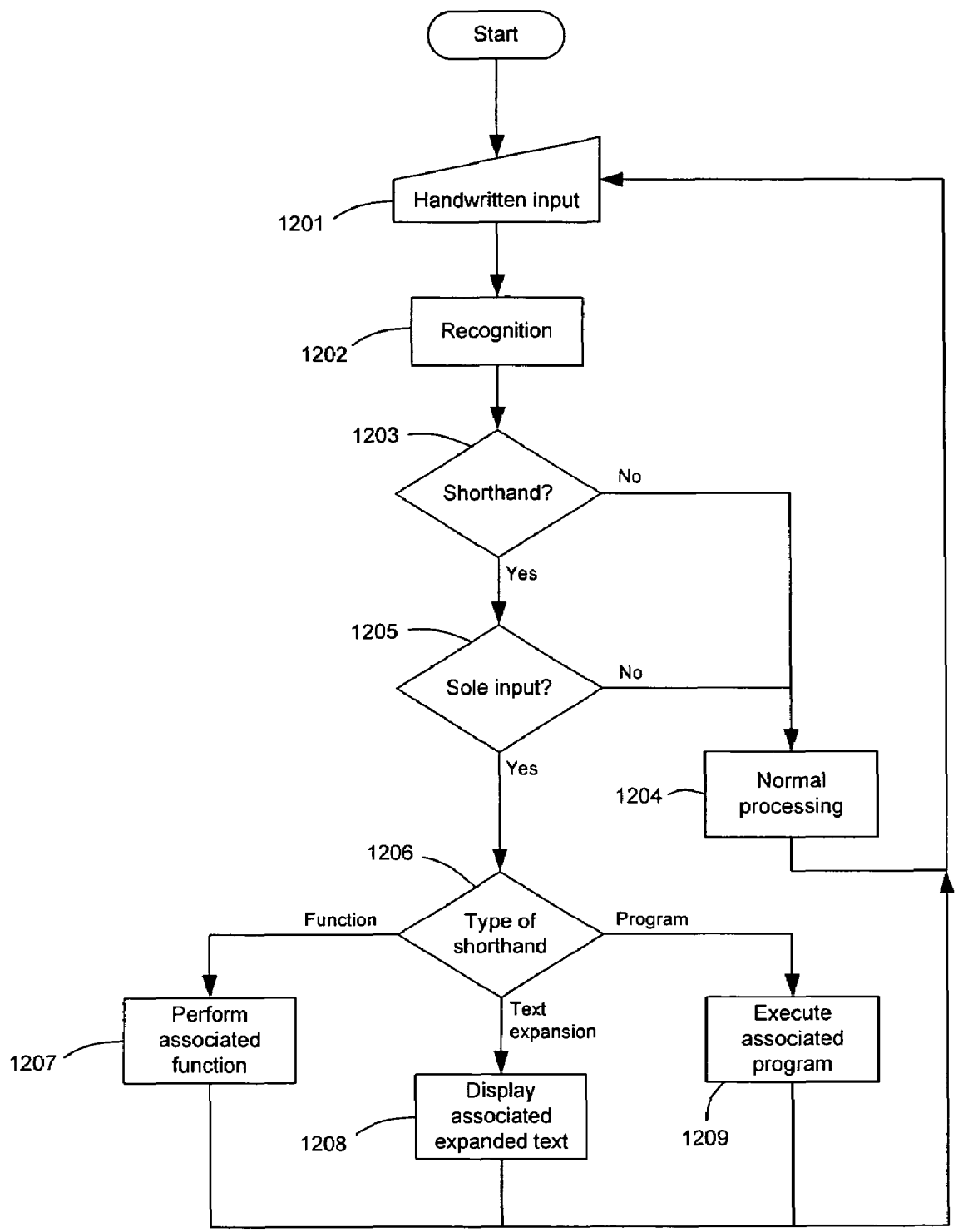
FIG. 12 is an alternative illustrative flowchart showing steps that may be taken to receive, interpret, and act upon handwritten shorthand.

FIG. 12 shows another illustrative variation in which each type of shorthand entry is expanded only if the shorthand entry is the sole handwritten input. In this embodiment, handwritten user input is received (step 1201), and the handwritten user input is recognized (step 1202). The computer determines whether the handwritten input is shorthand (step 1203). If not, then the handwritten input is processed as it may normally otherwise be processed (step 1204). However, if the handwritten user input is shorthand, then the computer may further determine whether the shorthand entry is the sole handwritten input (step 1205). If not, then the handwritten input may be normally processed in step 1204. If so, then the shorthand entry may be expanded upon appropriately in step 1206 and steps 1207, 1208, or 1209.

Accordingly, an improved way of managing, implementing, and interpreting handwritten shorthand in a computer system has been described. In addition, shorthand may now be flexibly used not only for producing expanded text, but also for implementing functions and for launching executable programs.

While illustrative systems and methods as described herein embodying various aspects of the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments. Also, the invention has been defined using the appended claims, however these claims are exemplary in that the invention is intended to include the elements and steps described herein in any combination or sub-combination. It will also be appreciated and understood that modifications may be made without departing from the true spirit and scope of the invention.

What is claimed is:

1. In a computer, a method comprising the steps of:
    assigning a same symbol to each of a text expansion, a program, and a function, wherein the same symbol is assigned as a shorthand entry of each of the text expansion, the program, and the function;
    receiving handwritten user input;
    determining that the handwritten user input represents the symbol;
    determining that the handwritten user input is a sole input, wherein the sole input does not have associated with it another user input; and
    based on the handwritten user input comprising the sole input, carrying out the function by generating an output.

2. A computer-readable medium storing computer executable instructions that when executed by a computer, cause the computer to perform a method comprising:
    assigning a same symbol to each of a text expansion, a program, and a function, wherein the same symbol is assigned as a shorthand entry of each of the text expansion, the program, and the function;
    receiving handwritten user input;
    determining that the handwritten user input represents the symbol;
    determining that the handwritten user input is a sole input, wherein the sole input does not have associated with it another user input; and
    based on the handwritten user input comprising the sole input, carrying out the function by generating an output.

3. The method of claim 1, wherein the context is associated an entity receiving the handwritten user input and a number of symbols in the handwritten user input.

4. In a computer, a method comprising steps of:
    receiving a handwritten user input including a first symbol, which is a shorthand entry of both of an expanded text and a program;
    determining that the handwritten user input includes a second symbol in addition to the first symbol;
    based on the handwritten user input including the second symbol, selecting the text expansion to be displayed; and
    displaying the text expansion in place of the first symbol.

5. The method of claim 4, wherein the first symbol consists of a single word.

6. The method of claim 4, wherein the second symbol includes any handwritten user input other than the first symbol that is simultaneously displayed with the first symbol.

7. The method of claim 4, wherein the second symbol consists of any handwritten user input on a same line as the first symbol and simultaneously displayed with the first symbol.

8. The method of claim 4, wherein the step of selecting includes determining that a total handwritten user input word count is greater than one.

9. The method of claim 8, the handwritten user input does not include the second handwritten input and therefore launching the program associated with the first handwritten user input.

10. The method of claim 8, wherein the total handwritten user input count is greater than one and based on a determination that the handwritten user input includes the second handwritten user input either replacing the first handwritten user input with the expanded text or displaying the first and second handwritten user inputs.

11. The method of claim 4, further including third determining whether all handwritten user input has stopped, the step of selecting being performed in response to determining that all handwritten user input has stopped.

12. The method of claim 4, further including a step of waiting a predetermined period of non-zero time after the step of receiving, the step of selecting being performed after the step of waiting.

13. A computer-readable medium storing computer-executable instructions that, when executed by a computing device, cause the computing device to perform a method comprising:
    receiving a handwritten user input including a first symbol, which is a shorthand entry of both of an expanded text and a program;
    determining that the handwritten user input includes a second symbol in addition to the first symbol;
    based on the handwritten user input including the second symbol, selecting the text expansion to be displayed; and
    displaying the text expansion in place of the first symbol.

14. The method of claim 4, further including:
    prior to receiving the first handwritten user input, receiving user input identifying the text expansion and the program.

15. In a computer, a method comprising steps of:
    receiving handwritten user input;
    recognizing the handwritten user input to determine a symbol;

determining expanded text represented by the symbol;
determining a function represented by the symbol wherein the function takes an input and generates an output;
determining a program represented by the symbol;
automatically determining that the handwritten user input is a sole entry; and
launching the program.

16. A computer-readable medium storing computer-executable instructions that, when executed by a computing device, cause the computing device to perform a method comprising:

receiving hand written user input;
recognizing the handwritten user input to determine a symbol;
determing expanded text represented by the symbol;
determining a function represented by the symbol wherein the function takes an input and generates an output;
determining a program represented by the symbol; and
launching the program.

17. The method of claim 15, further including, prior to receiving the handwritten user input, receiving user input identifying the symbol, the text expansion, and the program.

* * * * *

UNITED STATES PATENT AND TRADEMARK OFFICE
CERTIFICATE OF CORRECTION

PATENT NO. : 7,650,568 B2 Page 1 of 1
APPLICATION NO. : 10/767847
DATED : January 19, 2010
INVENTOR(S) : Williamson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 584 days.

Signed and Sealed this

Twenty-third Day of November, 2010

David J. Kappos
*Director of the United States Patent and Trademark Office*